April 7, 1964     H. VAN DE LOO     3,127,789
FOOT PEDAL STRUCTURE FOR BICYCLES AND LIKE VEHICLES
Filed May 20, 1960     2 Sheets-Sheet 1

INVENTOR
Heinrich van de Loo
BY
Lowry & Rinehart
ATTYS.

April 7, 1964 H. VAN DE LOO 3,127,789
FOOT PEDAL STRUCTURE FOR BICYCLES AND LIKE VEHICLES
Filed May 20, 1960 2 Sheets-Sheet 2
FIG. 3
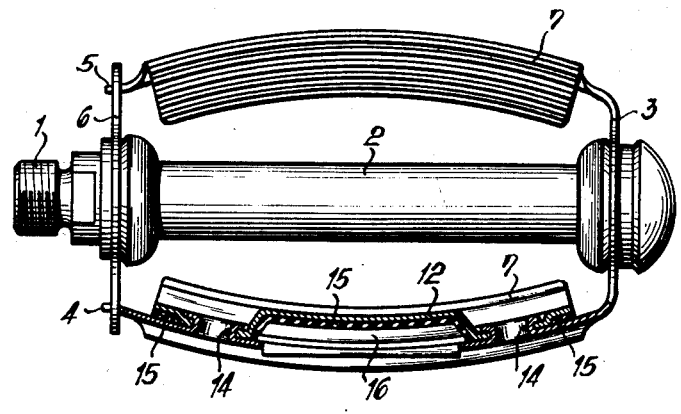
FIG. 4
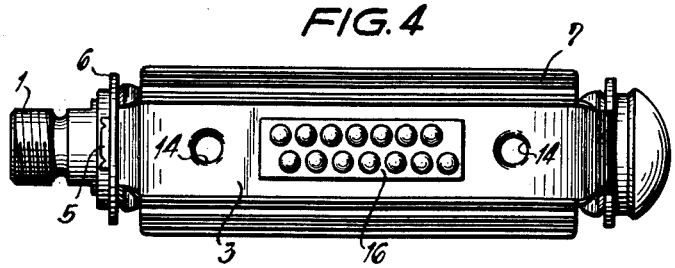
FIG. 5
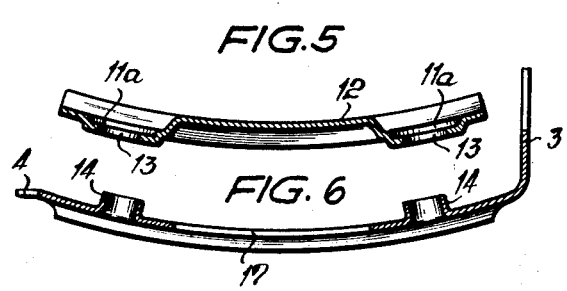
FIG. 6
INVENTOR
Heinrich van de Loo
BY
Lowry & Rinehart
ATTYS.

3,127,789
FOOT PEDAL STRUCTURE FOR BICYCLES AND LIKE VEHICLES
Heinrich van de Loo, Lendringsen, Kreis Iserlohn, Germany, assignor to Union Sils, van de Loo & Co., Frondenberg (Ruhr), Germany, a firm
Filed May 20, 1960, Ser. No. 30,534
2 Claims. (Cl. 74—594.4)

This invention relates to foot pedal structures for bicycles and like vehicles and more specifically to a foot pedal structure with two foot rests of rubber or any other suitable elastic material which are secured to the foot pedal frame by means of elongated plates.

In the known foot pedals of this type the elongated plates are secured to the foot pedal frame by means of screws and nuts. In order that the riding vibrations not cause the nuts to shake loose, the latter must additionally be provided with a special locking device.

It is the object of the present invention to overcome this drawback and to provide a foot pedal which is designed for economical manufacture, positive operation, and long service.

This foot pedal structure ensures a safe fixation of the plates and the rubber foot rests. The shanks of the tubular rivets can be formed, in a known manner, from the material of the legs or of the plates so as to be integral therewith. In order to prevent the rivet heads from projecting outwardly, they are countersunk in depressions provided in the legs and the plates. To eliminate the use of spacer members by means of which the plates are held at a distance corresponding to the cross-sectional configuration of the rubber foot rests, the depression portions provided in the legs and the plates are expediently formed as spacer members. The depressions formed as spacer members are preferably provided on the plates and have holes which are adapted to the outer diameter and the spacing of the rivet shanks formed integral with the legs.

Two preferred embodiments of the invention will now be described by way of example and with reference to the accompanying drawings, in which:

FIG. 3 is a top plan view, partly in section, of another form of construction of the foot pedal;

FIG. 4 is a side elevational view of the foot pedal as shown in FIG. 3; and

FIGS. 5 and 6 are longitudinal sections through details of the pedal.

Figure 1:
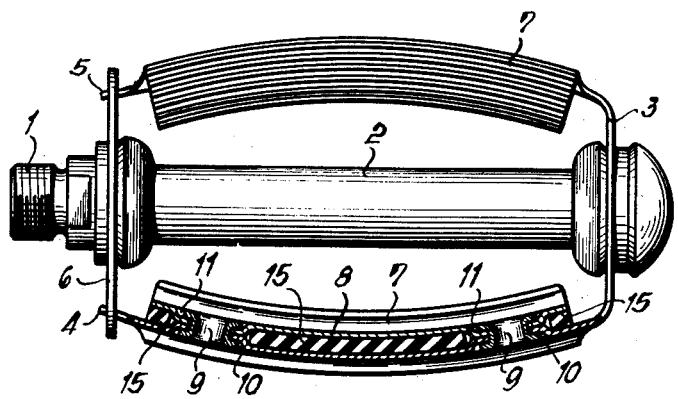
FIG. 1 is a top plan view, partly in section, of a foot pedal according to the invention.
Figure 2:
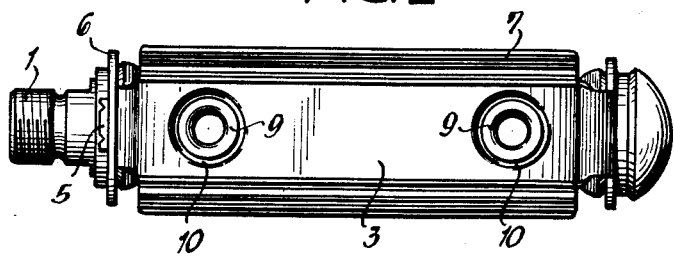
FIG. 2 is a side elevational view thereof.

FIGS. 1 and 2 show a foot pedal with a frame made of sheet metal and composed of a substantially U-shaped stirrup 3 with elongated legs and a transverse web 6 which connects the free ends 4 and 5 of the legs and may be detachably or undetachably secured thereto. The foot pedal frame is pivotally mounted on a pedal pin 1 in a known manner. The narrow side, that is the middle portion of the stirrup 3, is connected to the transverse web 6 by a tubular journal sleeve 2 through which the pedal pin 1 projects. Secured to each of the two legs of the U-shaped stirrup 3 is an elongated plate 8 which retains a foot rest 7 made of rubber or any other suitable elastic material in its position between said plate and the leg. Each one of the foot rests 7 has a double T-shaped cross-sectional configuration with flanges and a web 15 therebetween. The flanges are so arranged that their inner sides rest on the longitudinal edges of the legs and the elongated plates 8.

In the foot pedal structure as shown in FIGS. 1 and 2, the two elongated plates 8 are riveted to the legs of the U-shaped stirrup 3 by means of tubular rivets 9. The tubular rivets 9 have heads which are countersunk in the legs and the plates 8. To this end, depressions 10 and 11 are provided in the legs and in the plates 8, respectively. The depth of the depressions 10 and 11 is conformed to the wall thickness of the foot rest web 15 whereby the elongated plates 8 are held at a proper distance from the legs of the U-shaped stirrup 3 so that special spacer members are saved.

In the reflector foot pedal structure as shown in FIGS. 3 and 4 the tubular rivets 9 serving for fixing two elongated plates 12 are formed from the material of the two legs of the U-shaped stirrup 3 so as to be integral therewith. FIG. 6 shows a longitudinal section through one of the legs of the U-shaped stirrup 3 with rivet shanks 14 formed integral therewith. FIG. 5 shows a longitudinal section through one of the elongated plates 12 which are provided with depressions 11a the depth of which is conformed to the wall thickness of the foot rest web 15. In the depressions 11a holes 13 are provided so that the plates 12 can be pushed on to the rivet shanks 14. For the reception of a reflector element 16 openings 17 are provided in the legs of the U-shaped stirrup 3. Furthermore, the plates 12 have a trough-shaped recess which is conformed to the rear side of the reflector element 16. On mounting the foot rests 7 and the plates 12 on the U-shaped stirrup 3 the foot rest web 15 will engage the rear side of the reflector element 16 and urge the latter against the edge of the opening 17. The rivet head resulting during the riveting process is countersunk in the depressions 11a.

In a known manner the foot rests 7 are at their surfaces provided with flutings or grooves in order to increase the frictional force between the surfaces of the foot rests and the shoes of the bicyclist.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

I claim:

1. A bicycle pedal comprising a U-shaped bow frame member having a plate portion and side members integral with the plate portion, an end plate spanning the ends of the side members, a tubular frame member adapted to receive a pedal axle connecting said plate portion with the end plate, foot rests of rubber and holding plates to keep said foot rests on the side members, there being tubular rivet shanks formed integral with the side members extending through and substantially filling apertures in the holding plates for maintaining the holding plates and the foot rests firmly against the side members, and heads on the tubular shanks countersunk in depression portions in the holding plates arranged to serve as spacer members between the side members and the holding plates.

2. A bicycle pedal comprising a U-shaped bow frame member having a plate portion and side members integral with the plate portion, an end plate spanning the ends of the side members, a tubular frame member adapted to receive a pedal axle connecting said plate portion with the end plate, foot rests of rubber and holding plates to keep said foot rests on the side members, there being tubular rivet shanks formed integral with the side members extending through and substantially filling apertures in the holding plates for maintaining the holding plates and the foot rests firmly against the side members, and heads on the tubular shanks countersunk in depression portions in the holding plates arranged to serve as spacer members between the side members and the holding plates, said depressions having apertures mating with the outer diameter and the spacing of the rivet shanks.

References Cited in the file of this patent

UNITED STATES PATENTS

| | | |
|---|---|---|
| 527,520 | Copeland | Oct. 16, 1894 |
| 530,899 | Perkins | Dec. 11, 1894 |
| 1,832,098 | Cole | Nov. 17, 1931 |
| 2,221,854 | Zalkind | Nov. 19, 1940 |
| 2,899,842 | Krokos et al. | Aug. 18, 1959 |

FOREIGN PATENTS

| | | |
|---|---|---|
| 131,846 | Great Britain | Sept. 4, 1919 |
| 167,121 | Great Britain | Aug. 4, 1921 |
| 297,217 | Great Britain | Sept. 20, 1928 |
| 827,144 | Great Britain | Feb. 3, 1960 |
| 421,385 | Italy | May 22, 1947 |
| 1,089,653 | Germany | Sept. 22, 1960 |

OTHER REFERENCES

Excel, Inc., "Am. Bicyclist and Motorcyclist," October 1960 (page 31).

Crane Edmund Corp., "Am. Bicyclist and Motorcyclist," February 1962 (page 26).